3,098,065
ORGANIC COMPOUNDS AND PROCESS OF PRODUCING THEM

Samuel B. Crecelius and Thomas E. Brunelle, St. Paul, Minn., assignors to Economics Laboratory, Inc., St. Paul, Minn., a corporation of Delaware
No Drawing. Filed Apr. 12, 1961, Ser. No. 102,370
2 Claims. (Cl. 260—234)

This invention relates to organic compounds, and has for its object the provision of a new class of organic compounds and a process of producing the compounds. The process comprises forming an intermediate from a sugar and an epoxide and reacting the intermediate with a cyclic anhydride, and can be carried out easily and simply at atmospheric pressure with water as the solvent, thus avoiding the use of expensive solvents required in the heretofore proposed commercial chemical processes involving the synthesis of sugar derivatives.

In accordance with the invention, monosaccharides, as may be derived from sucrose or corn syrup, are reacted in aqueous solution with butylene oxide in the presence of boric or sulfuric acid catalyst, and the resulting reaction product is reacted with a cyclic anhydride of an organic dicarboxylic acid of the group consisting of phthalic anhydride or maleic anhydride, thereby yielding the final product of the invention.

The final products are the half-esters of the sugar-epoxide intermediates and thus contain free carboxyl groups which impart to the product the acidity so necessary for its effective use in rinsing formulations. The compounds neutralize and sequester alkaline salts which occur in some rinse waters. The product is particularly useful as a rinsing agent in dishwashing, and is especially effective when mixed with nonionic surfactants such as the alkyl polyoxyethers and the alkyl aryl polyoxyethers, giving rinse formulations which almost eliminate spotting and streaking of dishes and silverware, even when the rinse water has a high concentration of alkaline solids.

The monosaccharides may be derived from sucrose, a disaccharide or corn syrup, by hydrolysis which takes place under the conditions of this process; also a pure monosaccharide itself may be used such as commercially available dextrose (glucose).

Butylene oxide, which is now available commercially, is a suitable epoxide for the process. This epoxide is preferred because of its availability and because of the fact that it imparts the desired amount of hydrophobic character to the intermediate which not only proves to be advantageous for the final product, but also is adequate for solubilizing the cyclic anhydride making possible the second step of the process. Either the 1,2 or 2,3-butylene oxide can be used with equal success, but presently the 1,2-isomer is preferred. Phthalic anhydride or maleic anhydride can be used directly in any suitable commercial grade.

The intermediate product of the process formed by the reaction of the monosaccharide with butylene oxide is a viscous, pale yellow, water soluble liquid. It has enough hydrophobic character to dissolve many organic materials, a property of the intermediate which is essential for success in the next step of the process.

In carrying out a process of the invention for the preparation of the intermediate, the butylene oxide is added slowly to an aqueous solution containing the monosaccharide and the catalyst at betwen 75° C. and 90° C. at atmospheric pressure. Both sulfuric and boric acid work satisfactorily as catalysts, but the latter is favored because it brings about faster reaction rates and lighter colored products with greater thermal stability. The aqueous solution contains 40–45 grams of water and 6.2 grams of boric acid (or between 0.1 and 0.4 gram of sulfuric acid) per mol of monosaccharide unit. The butylene oxide added amounts to 4 mols per mol of monosaccharide unit. This proportion of epoxide is the maximum that will react under the cited reaction conditions. The addition reaction is exothermic (after a short induction period) and usually cooling of the reaction mixture is required during the addition.

It is assumed, in the light of current theory, that the epoxide reacts with hydroxyl groups on the sugar molecule giving alpha-hydroxy alkyl sugar ethers. Since each monosaccharide molecule has several reaction sites available, and since there is insufficient epoxide present to react on all available sites, a gross mixture results. A further complication is the side reaction which accompanies the etherification of the sugar. This side reaction is hydrolysis of the epoxide in the presence of the acid catalyst resulting in a 1,2-diol. Hydrolysis is extensive in the early stages of the reaction and continues throughout the addition leaving only a fraction of a percent of water at the end. Thus, of the four mols of epoxide added per mol of monosaccharide unit a portion of it is hydrolyzed and the remainder can react with the sugar molecule which gives, altogether, the complex mixture called the intermediate product or compound.

In the final step of the process, the intermediate product is reacted with either phthalic anhydride or maleic anhydride in the temperature range of from 100° C. to 120° C. to yield the final half-ester compound with the free carboxyl groups. In this step the ratio of reactants is such that one mol of phthalic anhydride is reacted with the weight of sugar-epoxide intermediate derived from one mol of monosaccharide.

Since the sugar-epoxide intermediate is a mixture of diols, polyhydroxy compounds and water, reaction with phthalic anhydride will yield a gross mixture of half-esters. Although the product of the invention consists of a gross mixture, there is in this mixture a substantial proportion of the compound which is a half-ester of a hydroxy ether of a monosaccharide.

Since acid anhydrides react with hydroxyl groups at much lower temperatures than do carboxylic acids, forming an ester linkage without the elimination of water and at the same time producing a free carboxyl which, by virtue of the fact that the anhydride used is cyclic, is attached to the ester linkage through a carbon to carbon chain, it is thereby possible by keeping the reaction temperature at a 120° C. maximum to produce a compound with a carboxyl group attached to the sugar-epoxide intermediate moiety.

If the sugar-epoxide reaction intermediate is illustrated by the general formula

where R represents any radical in the intermediate molecule which is attached to a carbon atom having on it a free OH group, and R₁ represents the radical comprising the remaining portion of the intermediate molecule attached to the same carbon atom, the reaction of the OH group with phthalic anhydride may be illustrated as follows:

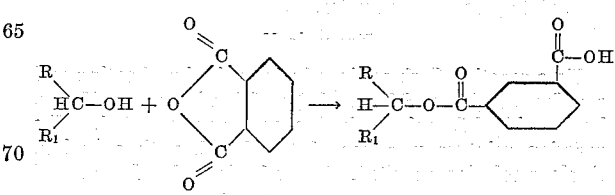

In carrying out the foregoing reaction the temperature is kept in the range of 100°–120° C. so that the undesirable side reaction of direct esterification of the free carboxyl with another free hydroxyl group will be kept at a minimum, since it is possible for this side reaction to occur at temperatures appreciably above this temperature range.

The final products of this invention of the sugar-epoxide product and the cyclic anhydride are viscous liquids, orange to brown in color, which dissolve readily in water giving acidic solutions. A one percent aqueous solution has a pH of around 2.5–3.0.

Rinsing formulations containing this product show remarkable performance even when used in rinse water which is high in alkaline solids. Dishes and silverware rinsed in water containing such formulations will dry devoid of spots or streaks which would be indicative of residual solids. The half-ester product also appears to have a synergistic effect as evidenced by improved performance with a lower concentration of the other ingredients in the formulation.

The unusual properties of this product are apparently due to the fact that it has acidic character and has sequestering ability. Its greatest asset is that it prevents deposition of solids when used as an additive in rinsing formulations, without interfering with the rinsing properties of the surfactants used therein, and actually appearing to enhance their activity. Ordinary organic acids or presently available surfactants lack this unique characteristic.

The following examples illustrate operations carried out in accordance with the process of the invention.

*Example I*

To a reaction flask equipped with an agitator and reflux condenser 171 g. (0.5 mol), sucrose 6.2 g. (0.1 mol) boric acid and 50 g. of water were added. The reaction mixture was heated to 80° C. with agitation. At this point the dropwise addition of a 288 g. (4.0 mols) portion of butylene oxide was begun. The addition rate was adjusted so that a mild reflux was maintained. After a 15 to 20 minute induction, the reaction rate increased and thus a corresponding increase in the addition rate of butylene oxide was made. At this point the reaction became exothermic and external cooling was required with care taken not to allow the reaction temperature to rise above 90° C. The reaction was considered complete when the total amount of butylene oxide had been added and the reflux subsided. The over-all addition required 2 hours from the first point of addition. The final product was a clear, light colored liquid. The product was then heated to 120° C. with agitation and 148 g. (1.0 mol) of phthalic anhydride was added. The phthalic anhydride dissolved into the reaction mixture in about 10 minutes. With continued agitation the reaction mixture was held between 115°–120° C. During this time the reaction mixture was sampled from time to time and a drop placed on a cold glass plate and rubbed with a glass rod. When no free phthalic anhydride crystallized from the cooled drop the reaction was considered complete. No crystallization appeared at the end of a 20 minute period from the time the phthalic anhydride had dissolved.

The resultant product was a light brownish viscous liquid with a pH of approximately 3. The physical constants of the product were as follows:

Surface tension at 0.1% conc. _____dynes/cm.__ 48.2.
Refractive index at 25° C. _____ 1.4933.
Completely soluble in water.

*Example II*

To a reaction flask equipped with agitation, heating and a reflux condenser 360 g. (2.0 mols) of glucose, 12.4 g. boric acid (0.2 mol) and 82 g. water were added. The reaction mixture was heated to 80° C. with agitation. A clear solution resulted. The addition of a 576 g. (8.0 mols) portion of butylene oxide was then begun with continued agitation. The butylene oxide was added at a rate which would maintain a constant reflux. As the experiment proceeded, the reaction rate increased with a comparable increase in the addition rate. As the reaction progressed, it became exothermic and external cooling was applied to maintain the reaction temperature under 90° C. The total addition of butylene oxide required a time of six hours. The final product was a light viscous liquid.

A 257 g. portion of the above intermediate product was weighed out into a beaker, and warmed to 80° C. on a hot plate. To the product 74 g. of phthalic anhydride was added and the reaction mixture was stirred continuously and heated to 120° C. At this point all the phthalic anhydride had dissolved in the reaction mixture. Samples were taken from time to time and a drop of each sample was rubbed on a cold glass plate with a glass rod. After the reaction had proceeded for 20 minutes at 120° C., no evidence of free phthalic anhydride crystallizing from the drop was evident. The reaction was then considered complete. The final product was a clear, light brown, viscous liquid having the following physical constants:

Surface tension at 0.1% conc. _____dynes/cm.__ 50.0
Refractive index at 25° C. _____ 1.4982
A 1% aqueous solution had a pH of 3.0.
Completely soluble in water.

*Example III*

To a reaction flask equipped with agitation, heating and a reflux condenser, 342 g. (1.0 mol) of sucrose, 100 g. water and 0.34 g. of concentrated sulfuric acid were added and the reaction mixture was heated to 75° C. with stirring. At this point the reaction mixture became a clear and homogeneous solution. The addition of 576 g. (8.0 mols) of butylene oxide was then begun. The addition rate was adjusted so that a mild reflux was maintained. As the reaction proceeded, it became exothermic. External cooling was applied so that the reaction temperature was maintained between 75° and 85° C. The complete addition required approximately 7 hours. The resultant product was a clear, light brownish colored, viscous liquid. The product was made neutral by addition of 10% aqueous KOH. A 308 g. portion of this product was weighed into a beaker and 83.0 g. (0.56 mol) of phthalic anhydride were added. This reaction mixture was heated to 120° C. with agitation. At this point the phthalic anhydride had dissolved and the reaction mixture was clear. The temperature was maintained at 120° C. and samples were taken from time to time. A drop of each sample was rubbed on a cold glass plate with glass rod. Any cloudiness or crystallization indicated that the phthalic anhydride had not completely reacted. At the end of 20 minutes no free phthalic anhydride crystals appeared in the product on testing, and the reaction was considered complete. The product had the following characteristics:

Refractive index at 25° C. _____ 1.4946
A one percent aqueous solution had a pH of 3.
Completely soluble in water.

*Example IV*

A charge of 450 g. of 80% active corn syrup and 12.4 g. (0.2 mol) boric acid was added to a reaction flask equipped with agitation, heating, and a reflux condenser. The reaction mixture was heated to 80° C. with stirring. At this point the addition of 576 g. (8.0 mols) of butylene oxide was begun. The addition rate was adjusted so that a mild reflux was maintained. After the first 30 minutes the reaction became exothermic and external heating was applied to maintain the reaction temperature between 80° and 90° C. At the end of 16 hours all the butylene oxide was added. The resultant product was a light brown, viscous liquid. A 104 g. portion of this product was weighed into a beaker, and 29.6 g. (0.2 mol) phthalic anhydride was added. The reaction mixture was heated to 120° C. with stirring at which point the phthalic anhydride dissolved. The temperature was maintained at 120° C. with agitation while samples were take at intervals of five minutes and a drop of each sample rubbed on a cold glass plate with a glass rod. At the end of 20 minutes no crystals of free phthalic anhydride appeared in the cooled sample. At this point the reaction was considered complete. The final product had the following properties:

Surface tension at 0.1% conc. _____dynes/cm__ 49.5
Refractive index at 25° C. _____ 1.4992
Completely soluble in water.
At one percent in aqueous solution, pH 3.

*Example V*

A 246 g. batch of sucros-butylene oxide reaction product was prepared by the method disclosed in Example I and 47 g. (0.478 mol) of maleic anhydride was added. The reaction was heated to 70° C. with agitation, at which point all the maleic anhydride was dissolved and the solution was clear. The temperature was raised to 100° C. and spot cooling tests such as those described in the previous examples were determined from time to time. At the end of 20 minutes all of the maleic anhydride had apparently reacted. The final product was a light brown, viscous liquid and had the following characteristics:

Surface tension at 0.1% conc. _____dynes/cm__ 51.4
Refractive index at 25° C. _____ 1.4767
A 1% aqueous solution had a pH of 2.24.
Completely soluble in water.

*Example VI*

The product from Example I was formulated into a rinsing formula for automatic dishwashers with commercial surfactants suitable for that purpose of which the following is an example:

| | Percent by weight |
|---|---|
| Example I | 30 |
| A nonionic surfactant known commercially as EL Pluronic | 20 |
| A nonionic surfactant known commercially as Triton CF-32 | 9 |
| Propylene glycol | 6 |
| Water | 35 |

The above formula showed sheeting properties equivalent to all proportions of these products used without Example I and with the same amount of water, and in addition showed far superior performance to any rinse formulation which could be formulated from commercially available surfactants when used in hard, alkaline water of greater than 140 p.p.m. and/or an alkalinity over pH 8, in that film from this alkalinity and/or hardness was completely eliminated or drastically reduced. In addition to this, the sheeting and draining properties of the rinse water are enhanced by the use of Example I in the formulation. Sheeting may be defined as the property imparted to the rinse water causing the water film left on the dishes to spread very thin without formation of drops, thus allowing quick evaporation of water left on the dishes.

This has been borne out both by laboratory experiment and in practical application in the field in areas where hard, alkaline water exists. It was found that the product such as Example I gave best performance when substituted in an above type formula in 25% to 35% by weight of the total formulation.

This application is a continuation-in-part of our co-pending application Serial No. 819,014, filed June 9, 1959, now abandoned.

We claim:
1. The process of producing an acidic organic product which comprises reacting one mol of monosaccharide in aqueous solution with about four mols of butylene oxide at a temperature of from 75° to 90° C. in the presence of a catalyst of the group consisting of boric acid and sulfuric acid, and reacting the product of the aforementioned reaction with a cyclic anhydride of the group consisting of phthalic anhydride and maleic anhydride at a temperature not above 120° C. to produce an acidic product including a half-ester of monosaccharide and butylene oxide reaction product.

2. In the process of claim 1 using in the second reaction about one mol of cyclic anhydride with a weight of monosaccharide and butylene oxide product derived from one mol of monosaccharide, and carrying out the reaction at a temperature in the range of 100° to 120° C.

References Cited in the file of this patent
UNITED STATES PATENTS

| 2,450,079 | Brown | Sept. 28, 1948 |
| 2,602,789 | Schwartz et al. | July 8, 1952 |
| 2,628,249 | Bruno | Feb. 10, 1953 |